Figure 1:
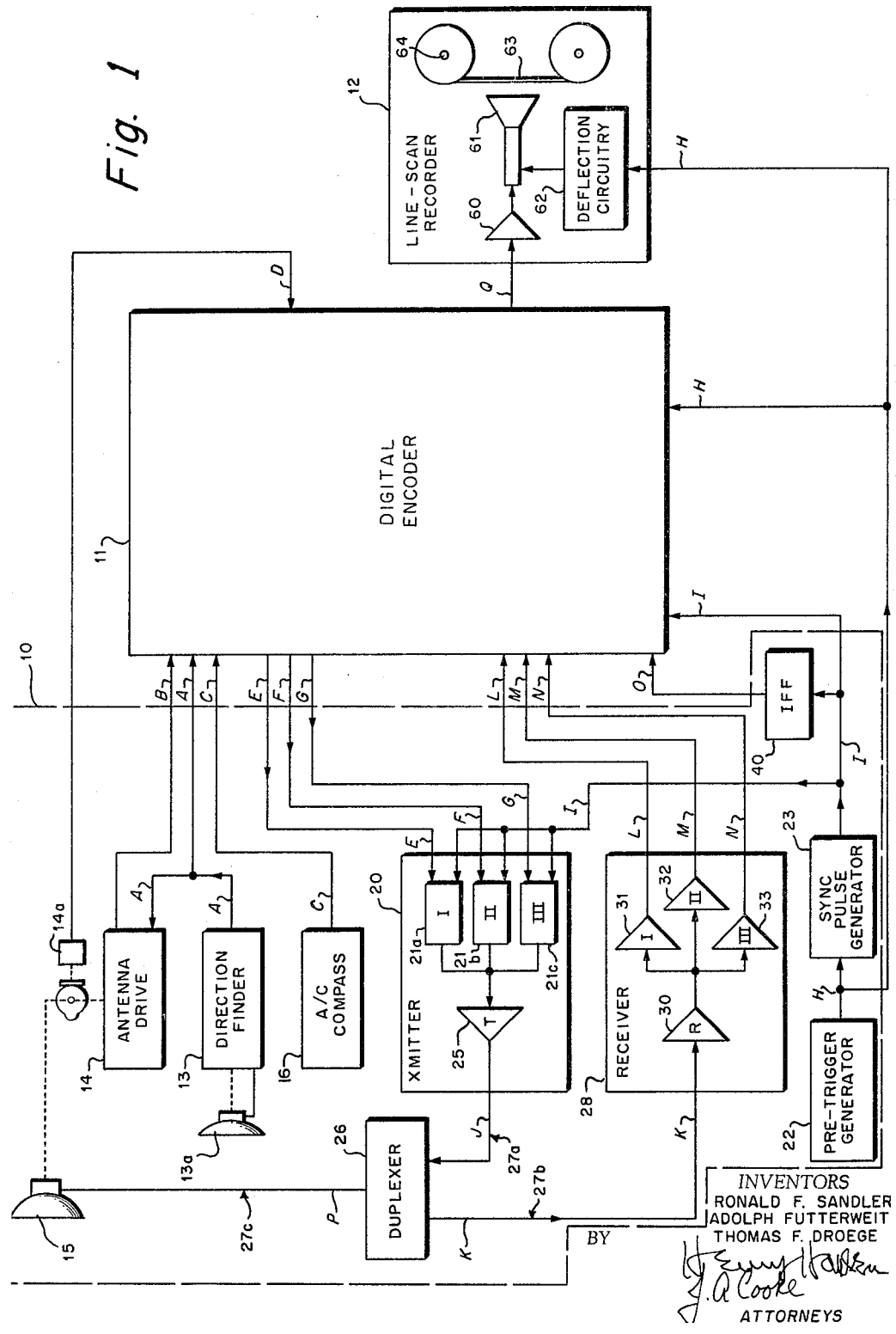

INVENTORS
RONALD F. SANDLER
ADOLPH FUTTERWEIT
THOMAS F. DROEGE
BY
ATTORNEYS

United States Patent Office 3,274,589
Patented Sept. 20, 1966

3,274,589
ENCODING AND RECORDING APPARATUS
Thomas F. Droege, Kendall Park, N.J., and Ronald F. Sandler, Elkins Park, and Adolf Futterweit, Levittown, Pa., assignors to the United States of America as represented by the Secretary of the Navy
Filed Feb. 27, 1964, Ser. No. 347,965
6 Claims. (Cl. 343—6)

The invention described herein may be manufactured and used by or for the Government of the United States of America for governmental purposes without the payment of any royalties thereon or therefor.

The present invention relates to a digital data encoding and video recording system for the purpose of encoding and recording in permanent form various physical phenomena.

In the detection of targets by radar techniques there exists a particular optimum mode of radar transmission for efficiently detecting a particular target under particular environmental conditions. The environmental conditions are variable and include such elements as sea state, wind state, target type, target direction, target relationship to wind direction, aircraft direction, sea direction, and antenna direction. The selection of the optimum mode of radar transmission entails the selection of one or many of such variables as transmission frequency, transmitted power, receiver characteristics, pulse width, antenna beam pattern, polarization discrimination, and transmission techniques including frequency diversity and pulse compression. Present procedures used in the acquisition of the data necessary for future use in the subsequent selection of the optimum mode of radar transmission for detection of a particular target involve the selection of a particular radar set having a specific pulse spectrum, and the utilization of this selected radar set in detecting the particular target type, for example, periscope wake. The radar operator takes "blip-scan" data or pictures of a plan position indicator (PPI) and at the same time records by hand his estimate of the long term physical environmental conditions, such as, sea state, target type, weather, and the like. Subsequently, another type of radar set having a pulse spectrum differing from the prior radar set would be selected and an attempt made to reconstruct the same experiment as indicated above. Here again the radar operator would take "blip-scan" data or pictures of the PPI display and at the same time record by hand subjective estimates of the long term physical environments mentioned above. This procedure is again repeated a sufficient number of times to acquire the amount of data necessary to obtain an adequate statistical analysis. One obvious problem that has arisen is the inaccurate data obtained due to the subjective determination by the radar operator of such things as weather, sea state, and similar environmental conditions. This fact obviously resulted in data of inefficient character and statistical inadequacy. Additionally, the information obtained was in such form as to preclude its use in making a system analysis in a quick, efficient and accurate manner.

A general purpose of this invention is to provide a digital data encoding and video recording system possessing none of the aforedescribed disadvantages. The present invention utilizes a device which makes repeated data taking unnecessary, controls the radar pulse spectrums at a rapid rate and simultaneously records in permanent form all of the necessary data so that the final selection of the proper radar or particular optimum mode of radar transmission would be based upon more statistically sound basis.

An object of the present invention is to provide a data encoding and recording system for encoding and recording physical phenomena.

Another object is to provide a digital data encoding and video recording system for the purpose of encoding and recording physical phenomena.

A further object of the present invention is the provision of a device which controls radar pulse spectrums at a rapid rate and records in permanent form the variable analog radar return signals in addition to external physical phenomena in digital form.

A still further object of the present invention is to provide a device for automatically encoding and recording in permanent form varying and various external physical phenomena.

A still further object of the present invention is to provide pulse to pulse high resolution recordings in permanent form.

Another object is to digitally encode all important environmental and transmission variables with the capability of automatic updating of such information.

Yet another object is to control variations in transmission modes of radar transmitters and to record the proper corresponding video outputs as the digital data is updated.

Another object of the present invention is to record in permanent form both digital and analog information on a predetermined time-shared basis.

Various other objects and advantages will be apparent from the following description of an embodiment of the invention and the novel features thereof will be particularly pointed out hereinafter in connection with the appended claims.

Figure 2:
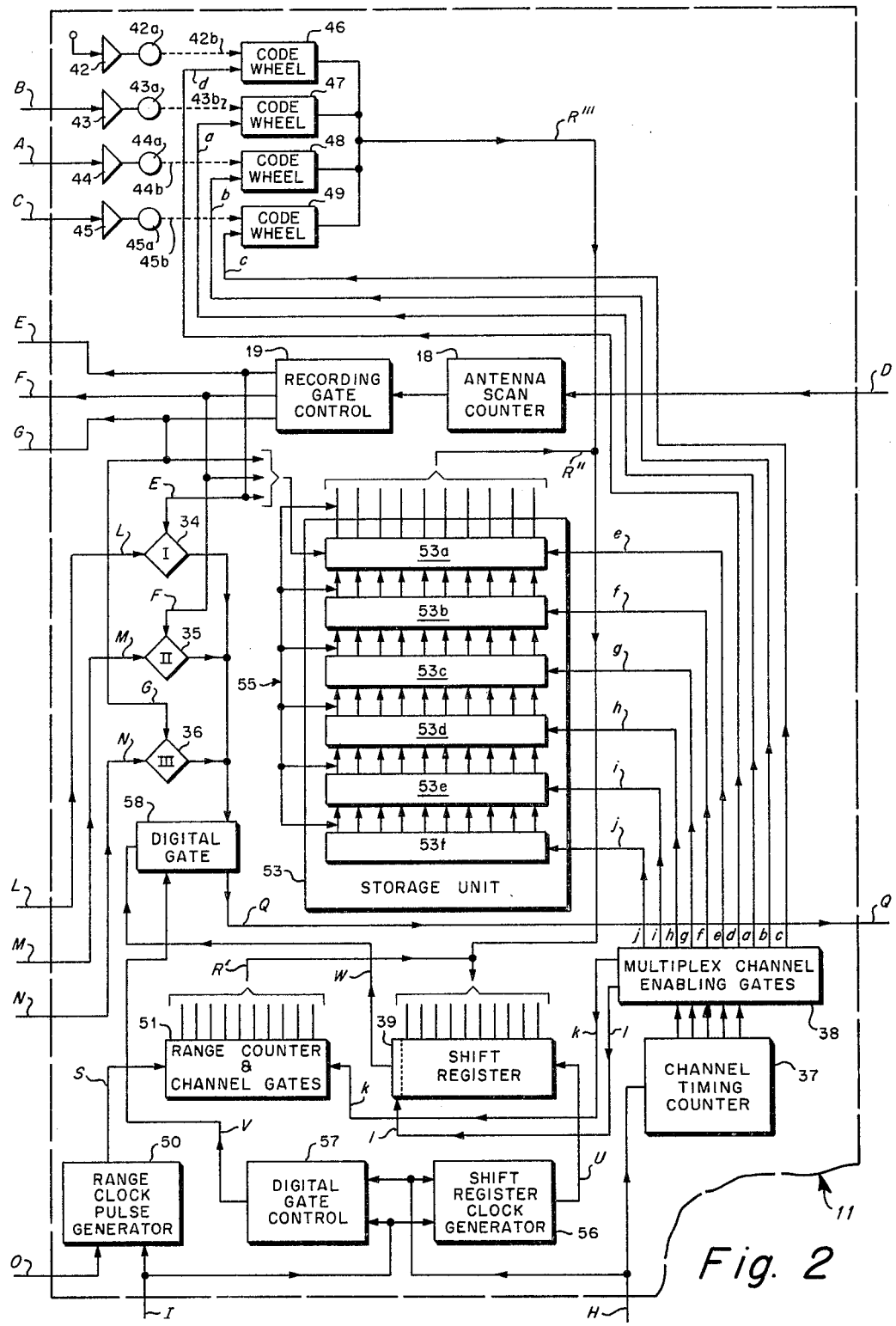

In the accompanying drawing:

FIG. 1 illustrates the system block diagram of an embodiment of the present invention, FIG. 2 illustrates a schematic block diagram of the digital encoder of FIG. 1, and FIGS. 3–9 are timing diagrams of various circuits of the present invention.

Referring now to FIG. 1 there is illustrated therein an airborne measurements radar system generally noted at 10, a digital encoder 11, and a line scan recorder 12, these elements constituting the basic elements of the present invention.

In FIG. 1 a target, not shown, is controlled by voice communication from the airborne radar operator and transmits a continuous wave (CW) signal suitable for continuous detection by a direction finder 13. The direction finder is of the commercial type and may be one of a number of available units, such as the U.S. Navy, ARN–6 system. This device has a suitable receiver and an antenna 13a which will track any target which transmits on the selected frequency and the output of which is three wire (synchro) information indicating the target azimuth relative to north.

The direction finder 13 has the output A therof coupled to the digital encoder generally indicated at 11 and also to an antenna drive 14 which mechanically drives a radar antenna 15. Antenna 15 sector scans a 45° angle, .i.e, continuously scans horizontally back and forth 22.5° about a central axis, that axis being the azimuth of the target location as determined by the direction finder antenna 13a. The synchro output B of the antenna drive 14 is connected to the digital encoder 11 and represents the instantaneous azimuth of the radar antenna 15.

A micro switch 14a is mechanically connected to the antenna drive 14 and produces an output pulse D when the micro switch is cammed closed for an instant at the conclusion of each sector scan cycle. See line D of the timing diagram of FIG. 3. The output D of micro switch 14a is connected to the digital encoder 11 and is used by the encoder for several functions which are dependent upon the antenna scan counts.

Synchro information output C of an aircraft compass 16 is coupled to the digital encoder 11 and indicates the instantaneous aircraft heading. Therefore, outputs A, B and C are available to the encoder 11 for the purpose of converting the same to digital information which will be recorded. This operation will be discussed below.

Figure 3:
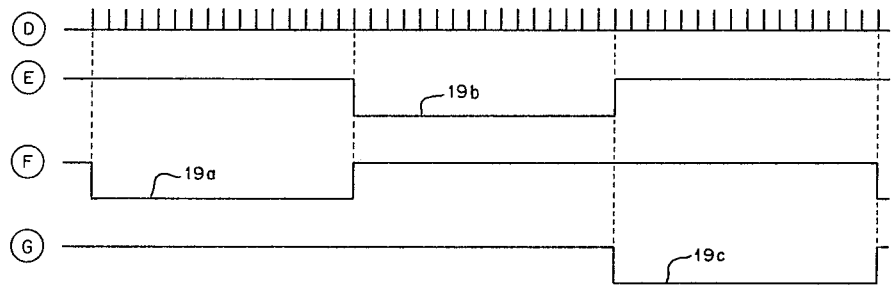

Referring to FIG. 2, the output pulse D of micro switch 14a is coupled through an antenna scan counter 18 to the transmission and recording gate control circuitry 19, each of which are circuits forming part of the digital encoder 11. The counter 18 is a conventional flip-flop counter and is coupled to the gate control circuitry 19 in such a manner that the output signals E, F and G of the gate control 19 include negative going control pulses 19a, 19b and 19c which are sixteen sector scan cycles in length. See lines E, F and G of the timing diagram of FIG. 3. Outputs E, F and G are coupled to and activate transmitter circuits 21a, b and c characterizing transmission modes I, II, and III, respectively, of a radar transmitter 20 by means of relays, not shown. As shown in FIGS. 1 and 3 the negative pulse 19b of output E will activate the transmitter subsystem mode I, negative pulse 19a of output F will activate transmitter subsystem mode II, and negative pulse 19c of output G will activate subsystem mode III.

In FIG. 1, a pre-trigger generator 22, the basic timing mechanism for the present invention, has the output H thereof coupled to a synchronous (sync) pulse generator 23, the digital encoder 11, and the line scan recorder 12. The circuits 21a, b and c of the transmitting modes I, II, and III are circuits which develop pulses of different width when triggered by the output pulse I of the sync pulse generator 23 which has been triggered in turn by pulse H of the pre-trigger generator 22 and which is coupled to each of the circuits 21a, b and c.

Transmitter circuits 21a, b and c are electrically coupled to a transmitting device 25 which is in this embodiment a traveling wave tube. The output J of the device 25 is supplied via conductor 27a to duplexer 26 which has the output P thereof coupled via conductor 27c to antenna 15. Duplexer 26 is connected (low impedance) to wave guide path 27a and is disconnected (high impedance) from wave guide path 27b during the transmission time to protect this high energy pulse from destroying the front end of a receiver indicated generally at 28. For the duration of the transmission period the duplexer 26 presents a high impedance path to the transmitter 20 and a low impedance path to the receiver 28 so that the antenna 15 receiving target returns will transfer them over wave guide path 27c, through the duplexer 26 and then over wave guide path 27b to the receiver 28.

The receiver input 30 of receiver 28 is on at all times as are the modes I, II, III, I.F. (intermediate frequency) amplifiers indicated at 31, 32 and 33. Each I.F. amplifier has the bandwidth thereof correctly matched to the pulse widths respectively needed for modes I, II and II transmissions.

Referring again to FIG. 2, the outputs L, M and N of the I.F. amplifiers 31, 32 and 33, respectively, are connected by coaxial cabling to video gates 34, 35 and 36, respectively, of the encoder 11. Also coupled to the video gates 34, 35 and 36 are the output signals E, F and G, respectively, from the transmission and recording gate control 19. Therefore it is seen that, in addition to the activation of the transmitter subsystem modes I, II and III, the gate control 19 turns on the correct video gate corresponding to the selected transmitted mode, i.e., if mode III has been transmitted due to the occurrence of a control pulse appearing at G, control pulse G will also enable the video gate 36, gate 36 having as its input the signal N from the I.F. amplifier 33 which is matched to the mode III transmission pulse width.

Figure 4:
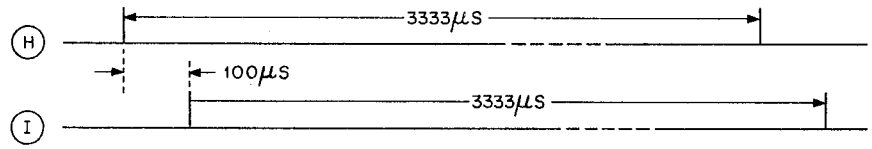
Figure 5:
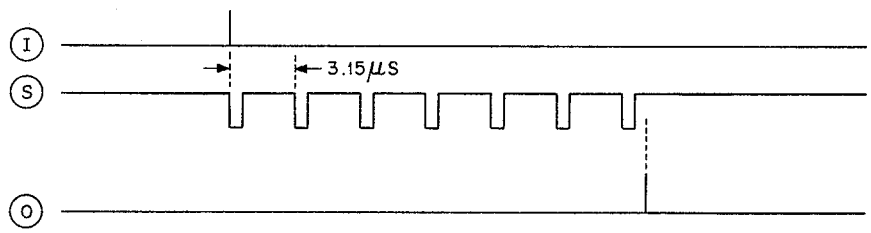
Figure 6:
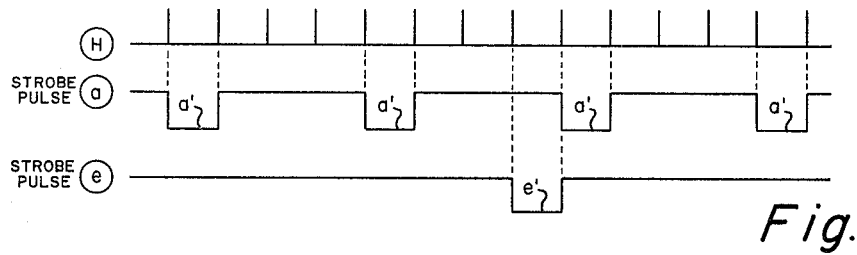

The sync pulse generator 23 of FIG. 1 delays the pre-trigger pulse H by 100 microseconds, see timing diagram of FIG. 4, and its output signal I is supplied to the transmitter subsystem modes I, II and III, the digital encoder 11, and an IFF (Identification, Friend or Foe) system 40. The IFF system 40 is one which is well known and used in the art, such as U.S. Navy APX-7, and is a radar system which transmits a coded pulse via its "interrogator" and receives a return pulse from a target having a "transponder" which is a receiver matching the coded pulse. In this embodiment the target is the controlled target, not shown, having a transponder which sends back a return pulse to the interrogating aircraft containing the IFF system 40, the output pulse 0 of which is supplied to the encoder 11 by means of coaxial cabling. The pulse output 0 of the IFF circuit 40 has a delay corresponding to the distance between the interrogator and the transponder.

Referring again to FIG. 2, the output pulse H from pre-trigger generator 22 is applied to a channel timing counter 37, a conventional flip-flop counter composed of five flip-flops which counts to thirty-two and then resets itself. In this embodiment the counter 37 is counting thirty-two sweeps, one of which is arbitrarily chosen as channel 1 when the recording phase first begins. The outputs of the five flip-flops comprising the counter 37 are coupled to a multiplex channel enabling gate 38 which is a gating system having twelve outputs denoted as the channel strobes a–1, that is, the outputs which allow the information stored in various information storing devices, such as code wheels 46, 47, 48 and 49, range counter and channel gates 51 and storage unit 53 to enter a shift register 39 as an input signal for subsequent recording. This operation will be further explained below.

Referring again to FIG. 2 for the description of the various information storing devices, the signals A, B and C in the form of synchro information and representing the direction finder azimuth, radar antenna azimuth, and aircraft azimuth, respectively, are coupled to servo amplifiers 43–45 which have three-wire inputs. These servo amplifiers drive through motors 43a–45a and their associated shafts 43b–45b, code wheels 47–49, respectively. Each code wheel has a shaft position input and a ten-bit digital output in parallel form for presenting the shaft angle information whenever power is applied to the code wheels by the enabling pulses, i.e., strobed from the multiplex channel enabling gates 38. It should be noted that there is no input to amplifier 42 illustrated in the present embodiment. Amplifier 42 and associated units 42a, 42b, 46, etc., are therefore spares which may be used to record any other three-wire information that the operator desires to record.

The sync pulse generator 23 has the output signal I thereof coupled to a range clock pulse generator 50 which is functionally a digital clock generator. Once pulsed on by the output pulse I of the synchronous pulse generator 23 the generator 50 will free run at a constant rate until pulsed off by the output signal 0 from the IFF video system 40. See timing diagram of FIG. 5. The output S of the range clock pulse generator 50 is supplied to range counter and channel gates circuit 51 which is a conventional flip-flop (FF) counter with one leg of an "and" gate connected to each of the ten flip-flops and the other leg of the "and" gate connected to the proper strobe channel of the multiplex channel enabling gates circuit 38. The output of the range counter 51 is ten-bit parallel information indicated at R' and representing a count of the pulses from the range clock 50 entering the range counter 51 between the sync pulse time and the IFF video return time. Since the clock pulse period is 3.15 microseconds apart this represents one-quarter mile increments of separation between the interrogator and the responder or, as in this case, between the aircraft and the target.

The storage unit 53 is an operator programmed unit in which slowly changing information, such as target type, sea state, etc., is stored. The unit 53 consists of six switch banks 53a–53f, inclusive, each containing ten switches except for switch bank 53a in which three switches are removed and output pulses E, F and G from the transmission and recording gate control circuitry 19 are connected to the three switch positions. The remaining fifty-seven switch positions represent storage positions which can indicate logical "1" or "0" outputs, the operator assigning meaning to a given output from a given group of switch positions. Each switch bank is strobed by the multiplex channel enabling gates 38 at different times in the multiplexing sequence. The outputs of the switch banks are ten-bit parallel information and each given switch positon in each switch bank is paralleled with a jumper wire. A representative jumper wire 55 is shown paralleling the first switch position in each of the switch banks of the storage unit 53. Therefore, it is seen that the output of the storage unit 53 is carried by one group of ten wires representing ten-bit parallel information and represented by output R″. These wires are connected in parallel, bit position for bit position, to the ten-wire outputs of both the code wheels 46–49, indicated at R‴, and to the ten-wire output of the range counter 51 indicated at R′. It should be noted that in the multiplexing concept all information to be encoded is always present at some location in the encoder 11 but it is recorded on a time-sheared basis only, that is, although azimuth range and switch programmed information exists at all times at the point where the ten wires carrying the ten-bit parallel information from each system are paralleled together physically, there is no informational output until the particular system whose time it is to be encoded is strobed by the multiplex channel enabling gates 38.

As indicated above, the pre-trigger generator 22 is connected by a coaxial cable to the channel timing counter 37 which is a conventional flip-flop counter composed of five flip-flops which count to thirty-two and then resets itself. The multiplex channel enabling gates 38 take these inputs and place them through "and" and "nor" circuitry in conventional fashion so as to produce twelve channels or strobe pulses which repeat their sequence every cycle of thirty-two pre-triggers. The outputs of the flip-flops are connected to a negative (voltage) "and" gate in a multiplex channel enabling gate 38 in such a manner that all flip-flop connections made to that "and" gate are negative on the counting of eight pre-trigger pulses H. This results in a negative pulse output e′ from that gate in the multiplex channel enabling gate circuitry 38 which is then connected to switch bank 53a and whose effect is to strobe out the information in switch bank 53a on the eighth channel. The same description applies to line a wherein the negative pulses a′ have the effect of strobing out the information in code wheel 47 on channels 1, 5, 9 and 13. As a further example, the following is the channel strobing sequence which may be used:

| Channel | Strobe Pulse | Information Store Unit |
| --- | --- | --- |
| 1 | a | Code wheel 47. |
| 2 | b | Code wheel 48. |
| 3 | c | Code wheel 49. |
| 4 | d | Code wheel 46. |
| 5 | a | Code wheel 47. |
| 6 | b | Code wheel 48. |
| 7 | c | Code wheel 49. |
| 8 | e | Switch bank 53a. |
| 9 | a | Code wheel 47. |
| 10 | b | Code wheel 48. |
| 11 | c | Code wheel 49. |
| 12 | f | Switch bank 53b. |
| 13 | a | Code wheel 47. |
| 14 | b | Code wheel 48. |
| 15 | c | Code wheel 49. |
| 16 | g | Switch bank 53c. |
| 17 | a | Code wheel 47. |
| 18 | b | Code wheel 48. |
| 19 | c | Code wheel 49. |
| 20 | h | Switch bank 53d. |
| 21 | a | Code wheel 47. |
| 22 | b | Code wheel 48. |
| 23 | c | Code wheel 49. |
| 24 | i | Switch bank 53e. |
| 25 | a | Code wheel 47. |
| 26 | b | Code wheel 48. |
| 27 | c | Code wheel 49. |
| 28 | j | Switch bank 53f. |
| 29 | a | Code wheel 47. |
| 30 | b | Code wheel 48. |
| 31 | c | Code wheel 49. |
| 32 | k | IFF (51). |

Figure 7:
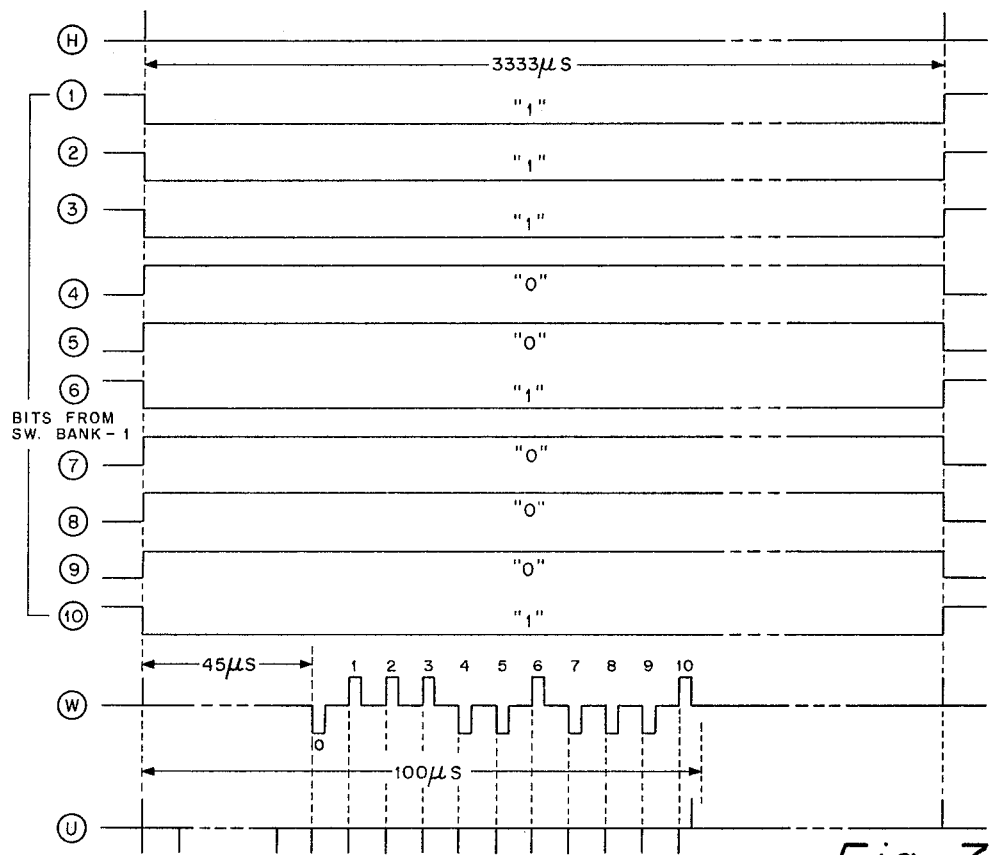
Figure 8:
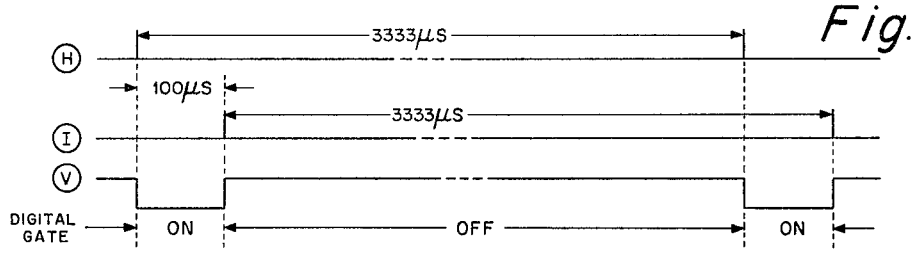

With references to FIGS. 2 and 7, the output signal 1 from the enabling gates circuitry 38 carries a strobe pulse, which occurs only on the first channel, to the shift register 39 to be used in developing a pulse to mark the first channel. The parallel ten-bit information wires are all coupled into the shift register 39 which functions to convert the parallel information to serial information, that is, information which varies with time once per channel. Parallel information indicated as singals R′, R″ and R‴ is supplied to the shift register 39 and is stored in the shift register flip-flops until a signal U from a shift register clock 56 appears at the steering circuit of the bit number 10 flip-flop. Then each bit is shifted out as output signal W at the clock rate which is, for example, 200 kc. The shift register clock generator 56 is a digital clock which is turned on by the pulse H of the pre-trigger generator 22 and turned off by the pulse I of the sync pulse generator 23. The output pulse U of the clock generator 56 is delayed for 45 microseconds before being supplied to the input of the shift register 39. In the shift register 39 a flip-flop is provided in front of the bit number 1 storage flip-flop to accept a pulse over input 1 which occurs only on a first channel so as to make it possible to tell which channel is number 1 for a reference to the others when looking at the recording. In this case a "1" will appear in the zero bit position only on the first channel. In channels 2 to 32 a "zero" will appear in this "zero" bit position. FIG. 7 illustrates the pre-trigger output pulse H and the programmed state of the flip-flops of bits 1–10 of switch bank 53a. The output signal W of shift register 39 is shown as it would be applied to a digital gate 58 and indicates the information in the switch bank 53a.

A digital gate control 57 is supplied with pulse H from the pre-trigger generator 22 and pulse I from the sync generator 23 in order to produce a control pulse V which turns the digital gate 58 on during the period between the pre-trigger and the sync pulse and off between the sync pulse and the pre-trigger pulse. See timing diagram of FIG. 8. In practice the digital gate control circuit 57 is a flip-flop. Digital gate 58 has supplied thereto video signals from the video gates 34, 35 and 36 in addition to digital information from the shift register 39. The serial information is shifted out of the shift register 39 at the time when the digital gate is on and this information is passed through the digital gate as an output signal Q. At the same time the digital gate 58 blocks the flow of the video signals from which ever of the video gates 34, 35 and 36 is turned on at the time. When the digital gate 58 is turned off by the digital gate control 57 the video flows freely as an output signal Q while the digital gate 58 presents itself as a high impedance circuit to the shift register 39 output. The resulting effect is to present a time-shared signal as an output signal Q which consists of digital information between the pre-trigger and sync pulse times and video information between the sync pulse time and the pre-trigger time. See FIGS. 8 and 9.

Figure 9:
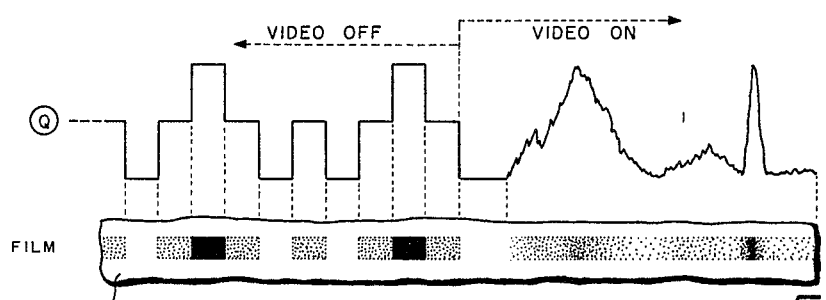

Referring to FIGS. 1 and 9, the line scan recorder 12 has applied thereto the time-shared signal Q at video frequency from the encoder unit 11 and converts this signal to a spot intensity modulated film. This is clearly seen in FIG. 9. The output signal Q from the digital encoder 11 is applied to a video amplifier 60 of the line scan recorder 12 which raises the video signal to voltage amplitudes sufficient to drive a CRT (cathode ray tube) 61 to which the output of the video amplifier 60 is connected. The output pulse H from the pre-trigger generator 22 is coupled to a deflection circuitry 62 the output of which is coupled to the CRT deflection coils producing a sweep across the "X" axis of the CRT 61. The video appears on the sweep in the form of a "Z" axis intensity modulation which is recorded on a film 63 which is continuously drawn past the CRT by a film drive 64. The film drive 64 operates at such a speed as to insure that the recorded sweeps are separated by at least the distance of a spot size diameter, for example, one mil. The intensity modulation of the CRT when translated to the film 63 appears as various shades of gray represented in FIG. 9 as black, white and dotted. The digital information is recorded at the extremes of the dynamic range of the system, that is in black and white, and the video encompasses the shades of gray in between.

To summarize the operation of the invention, let it be assumed that all systems except the recorder 12 involved in FIG. 1 have been turned on and the encoding has not yet begun. In other words, a target is present, the antenna drive system 14 has been turned on, the direction finder system 13 is on, and the aircraft compass system 15 is on. Transmission and reception of radar signals have not begun at this point, however, servo information from the target due to the target's presence is being supplied to the digital encoder from the antenna drive system, the direction finder and the aircraft compass. The antenna 15 begins to scan and pulse D generated by the micro switch 14a is supplied to the encoder 11. At this time operation of digital encoder 11 and the line scan recorder 12 is initiated and the radar operator turns on the radar transmission at 20. This starts the pre-trigger generator 22, the output pulse H of which pulses on the sync pulse generator 23 which, in turn, puts out a pulse I that is delayed 100 microseconds from the pre-trigger generator pulse. The sync pulse I, in turn, initiates transmission in the IFF system and is applied to circuits 21a, b and c of the radar system 20. If at the same time that sync pulse I is applied, pulse E, discussed below, is received by mode I, then mode I fires through the front end transmitter 25 and the transmitter output J is supplied to the duplexer 26 which is on only for the transmitted pulse period. The pulse reaches the antenna 15 through line 27c, the antenna having been already slaved to the target azimuth position due to the input A from the direction finder. The radar energy transmitted from mode I bounces off the target and is received by the same antenna 15. The antenna takes this video which is still on RF frequency, places it through the duplexer which provides a low impedance path at 27b and a high impedance path at 27a so that the information P is applied along path 27c, through the duplexer to line 27b and then as an input K to the front end amplifier traveling wave tube 30 of receiver 28.

Attention is now directed to the operation of the digital encoder upon the entrance therein of sync pulse I and pre-trigger pulse H. The antenna scan counter 18 has its count at "1," the channel timing counter 37 has also assumed the state of "1," and the range clock pulse generator 50 is operating to send out clock pulses. The digital gate control 57 is controlling the digital gates 58 so that it is on and the leg thereof coming from video gates 34–36 is closed. The shift register 39 is nonoperative. The servo amplifiers 43, 44 and 45 are receiving the servo information A, B, and C from the direction finder 13, the antenna drive 14 and the aircraft compass 15. The amplifiers in turn are rotating code wheels 47, 48 and 49 to their respective indicating positions.

When the antenna scan counter 18 assumes a state of "1" the recording gate control puts out the control pulse E. This has the effect of opening up video gate 34 and making transmission mode I operative as described above. At the same time it has placed input pulses into switch bank 53a so that we are now ready to transmit mode I, receive mode I, and to encode into parallel digital form in switch bank 53a the fact that mode I has been transmitted. At this time all of the received energy coming through amplifier 30 of receiver 28 goes through the intermediate frequency amplifiers 31, 32 and 33, but since the only video gate which is open to receive the received energy is gate 34, this gate is fed the proper IF amplifier output L. During this period of operation channel timing counter 37 has received a pre-trigger pulse H and in response thereto actuates the multiplex channel enabling gate circuitry 38, the multiplex channel enabling gates 38 then putting out control pulse "a" indicating that it is strobing channel 1. Strobe pulse $a$ is applied to code wheel 47. This means that the position of code wheel 47 will be coded in channel 1. This position is indicated in 10 bit parallel digital form and the output R''' from this code wheel is fed to shift register 39. It should be noted that the other ten-bit parallel information sources providing outputs R'' and R', such as storage unit 53 and range counter 51 respectively, do not feed their information to shift register 39 until strobed by their proper strobe pulses and that because of the strobe pulse $a$ only going to code wheel 47 on channel 1, which occurs between the first pre-trigger and the second pre-trigger period, only that code wheel's information is fed to the shift register 39. The function of shift register 39 is to convert all ten-bit parallel information reaching its input to serial information which will be fed as pulse W to the digital gate 58. The digital gate 58 will now be actuated, due to the digital gate control 57, for the 100 microsecond period between the pre-trigger and sync pulse. Due to the operation of the shift register clock generator 56 the shift register 39 now shifts out the information that was placed in parallel form in its input as an output W to the digital gate 58. Since the gate is on, the information W will pass therethrough and be available, as signal Q, to the recorder 12, signal Q being 10 bits of serial information. The digital gate now is turned off to the digital information W for a period of 3233 microseconds which is the time between the sync pulse and the subsequent pre-trigger pulse and is then turned on to receive during that period the input from the video gate 34 which is open and passes the analog information L from the mode I amplifier 31. This analog signal passes through gate 58 and is available as signal Q to the recorder 12.

The foregoing is a description of the result in having channel 1 of the thirty-two channels operative. In this operation, the output Q will be recorded on sensitive film in the form illustrated in FIG. 9 and will indicate the antenna position, since code wheel 47 was strobed, in digital format and the radar return from a mode I transmission in analog format.

Channel 2 begins at the generation of the second pre-trigger pulse H from the generator 22. This second pre-trigger pulse puts the channel timing counter into a count of "2," resets the digital gate control 57 so that the digital gate is on to receive the digital information W, and also resets the shift register clock generator 56 so that it starts putting out a series of pulses U which will be available to the shift register 39 to shift that information which it has entered therein. Referring back to the antenna scan counter 18, it is noted that since the antenna scan counter is not counting pre-trigger or sync pulses but rather is counting antenna scans, the counter 18 will not change state and the recording gate control 19 will not change state. Therefore, the operation of the control pulse E, F or G which in effect controls the video gates 34, 35 or 36, the transmission modes I, II or III and provides the input indicating such pulse to the switch bank 53a is not changed at all from channel number 1 operation.

Referring now to a channel 2 operation, on the second count from the counter 37, the multiplex channel enabling gates 38 put out a strobe pulse b, which is supplied to code wheel 48, code wheel 48 containing the information from the radio direction finder 13. Upon the occurrence of the channel enabling gate 38 strobing code wheel 48, the information contained thereon is applied as an output R''' to the shift register 39 as ten-bit parallel information indicating the direction finder azimuth. As soon as the clock pulses U enter the shift register 39, the shift register puts out as pulse W the ten bits in serial form to the digital gate 58. As stated previously the digital gate 58 is now on and the digital information W indicating the position of code wheel 48 is applied as pulse Q to the recorder. Again the occurrence of the sync pulse I after 100 microseconds from the pre-trigger will allow the analog signal L to be applied through digital gate 58, which has been turned off to the digital information by the digital gate control 57, to the recorder 12 as input Q. The same sequence of operations from pre-trigger to pre-trigger, from sync pulse to sync pulse, occurs repeatedly throughout a count of thirty-two pre-trigger pulses, at which time the whole sequence is repeated. The sequence in operation of the disclosed embodiment is indicated in the chart above.

It should be noted that at any time in the operation the operator may change the switch positions in any of the switch banks 53a–53f and the new information will be recorded when that particular switch bank receives a strobe pulse.

It should be further observed that operating independently of the pre-trigger generator 22 is the antenna scan counter 18 which after a count of 16 antenna scans changes count and indicates a count of 2. This indicated count of 2 effects the recording gate control 19 so that now a control pulse F is the output of the gate control 19. This has the effect, in turn, of effecting the transmission mode and the video gate state. This pulse F is also encoded into switch bank 53a. As soon as the recording gate control changes to this state the mode II transmission generation system is placed in the operative condition and modes I and III are no longer functional. The control pulse F reaching mode II sets mode II up to function whenever it receives a sync pulse I from sync pulse generator 23. The operation is then analogous to the mode I operation.

In summary, it is seen that the present encoding system multiplexes in the information from the various digital storage units on a pre-trigger to pre-trigger basis, that is, it goes through 32 channels every 32 pre-triggers but the video is recorded on a 16 antenna scan count basis, that is, after every 16 antenna scans the transmission mode is changed. Therefore, at the output of the digital encoder 11 there is information which is both digital and analog, the analog here being the video signal. The digital information has been time-shared on every pre-trigger basis and this time-shared information is further time-shared with the video information. Approaching this on a time basis, digital information occurs serially for the 100 microsecond period between pre-trigger and sync pulse and the video information occurs for the duration of the time between the sync pulse and the subsequent pre-trigger pulse.

In summarizing the operation of line scan recorder 12 the pre-trigger pulse H is applied to the deflection circuitry 62 which succeeds in putting a sweep across the CRT 61. Accordingly, the information Q coming from the digital encoder 11 is amplified by amplifier 60 and drives the cathode of the CRT 61. The CRT is operated so that the sweep is across the "X" axis. There is no "Y" axis deflection but rather the deflection is across the "Z" axis which results in an intensity modulation across the "X" sweep. This intensity modulation is now available for recording on film 63. The film drive 64 drives the film at a constant rate past the CRT face which results in the exposure of the film 63. The sweep retraces again repeatedly and these traces occur at a uniform spacing across the film. The front edge of the film will appear during the digital period as black, white and mixed shades of gray levels. When the analog information, i.e., video, comes in across the CRT, then a wide range of shades of gray are indicated by small spots written across the film. The number of shades of gray that can be written is determined by the dynamic range of the whole system which is a combination of the video itself, the CRT and the film. The spot sizes are again a combination of the phosphorous resolution, the film granularity and the ability to focus the tube. The result of this, of course, is a permanent record of all the various digital information, a permanent record of the video and the ability to review at a subsequent time and determine what was the target and the target environment, and the type of transmission used at the time that a specific video return was obtained. This in turn provides the ability to select the best radar parameters for use under a given specific situation.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An airborne digital data encoding and video recording system for use with a controlled target comprising in combination:
   target locating means providing an output signal representative of target location,
   a radar system including a transmitter, receiver and an antenna for detecting the target and having a video output signal indicative of the target and other targets comprising the target environment, said radar transmitter having a plurality of selectable transmission modes and said receiver having a plurality of compatible selectable receiving modes,
   data processing means including switch means both for manually encoding slowly changing environmental and transmission conditions and for automatically encoding the selected transmission and receiving modes, said switch means having an output indicative of said conditions and said modes, said data processing means receiving and digitally encoding on a time-shared basis said output signal from said target locating means and said output signal from said switch means,
   said data processing means time-sharing said digitally encoded time-shared signal with said video output signal, and
   recording means receiving said combined time-shared signal for a line scan recording whereby a recording is obtained for use in selecting the optimum mode radar transmission for detecting a particular target under particular environmental conditions.

2. The encoding and recording system of claim 1 wherein said recording means includes
a cathode ray tube receiving said combined time-shared signal,
a sweep generator and drive mechanism for displaying a sweep on said cathode ray tube,
film means exposed to said display on said cathode ray tube,
and drive means for transporting said film means.

3. A digital data encoding and video recording system operating from a station for use with a controlled target comprising in combination:
direction finding means providing an analog output signal representative of target azimuth,
range determining means providing an analog output signal representative of the range between the target and the station,
a radar system including a transmitter, receiver and an antenna for detecting the target and having a video output signal indicative of the target and other targets comprising the target environment,
said radar transmitter having a plurality of selectable transmission modes and said receiver having a plurality of compatible selectable receiving modes,
said radar system having a second output signal in analog format indicative of radar antenna azimuth,
said output signal from said direction finding means controlling the azimuth of said radar antenna according to its indicated target azimuth,
data processing means including switch means both for manually encoding slowly changing environmental and transmission conditions and for automatically encoding the selected transmission and receiving modes, said switch means having an output indicative of said conditions and said modes, said data processing means receiving and digitally encoding on a time-shared basis said analog output signal from said direction finding means, said analog output signal from said range determining means, said second analog output signal from said radar system and said output signal from said switch means, said data processing means further receiving said video output signal from said radar system,
said data processing means time-sharing said digitally encoded time-shared signal with said video output signal, and
recording means receiving said combined time-shared signal for a line scan film recording whereby a recording is obtained for use in selecting the optimum mode radar transmission for detecting a particular target under particular environmental conditions.

4. A digital data encoding and video recording system for use with a target comprising in combination:
a radar system including a transmitter, receiver and an antenna for detecting the target and having a video output signal indicative of the target and other targets comprising the target environment,
said radar transmitter having a plurality of selectable transmission modes and said receiver having a plurality of compatible selectable receiving modes,
said radar system having a second output signal in analog format indicative of radar antenna azimuth, said radar system further including a pre-trigger generator and a synchronous pulse generator coupled to said transmitter and triggered by said pre-trigger generator, said pre-trigger generator providing an output pulse at a consistent predetermined time before the occurrence of the output pulse of the synchronous generator,
means for receiving and digitally encoding on a time-shared basis said second analog output signal from said radar system and the selected transmission and receiving modes and further receiving said video output signal from said radar system, said means being coupled to said pre-trigger generator and said synchronous pulse generator,
said means additionally time-sharing said digitally encoded time-shared signal with said video output signal, wherein the digital information occurs during the period between the pre-trigger output pulse and the synchronous output pulse and the video information occurs during the period between the synchronous pulse and the pre-trigger pulse, and
recording means coupled to said pre-trigger generator and receiving said combined time-shared signal for a line scan recording whereby a recording is obtained for use in selecting the optimum mode radar transmission for detecting a particular target under particular environmental conditions.

5. An airborne digital data encoding and video recording system for use with a controlled target, the target having the ability to respond to a code signal and to transmit a continuous wave signal comprising in combination:
direction finding means providing an analog output signal representative of target azimuth,
compass means providing an analog output signal representative of aircraft heading,
range determining means providing an analog output signal representative of the range between the target and the aircraft,
a radar system including a transmitter, receiver and an antenna for detecting the target and having a video output signal indicative of the target and other targets comprising the target environment,
said radar transmitter having a plurality of selectable transmission modes and said receiver having a plurality of compatible selectable receiving modes,
said radar system having a second output signal in analog format indicative of radar antenna azimuth, said radar system further including a pre-trigger generator and synchronous pulse generator coupled to said transmitter and triggered by said pre-trigger generator, said pre-trigger generator providing an output pulse at a consistent predetermined time before the occurrence of the output pulse of the synchronous generator,
said output signal from said direction finding means controlling the azimuth of said radar antenna according to its indicated target azimuth,
data processing means for receiving and digitally encoding on a time-shared basis said analog output signal from said direction finding means, said analog output signal from said compass means, said analog output signal from said range determining means, said second analog output signal from said radar system, and said selected transmission and receiving modes, said data processing means further receiving said video output signal from said radar system, said means being coupled to said pre-trigger generator and said synchronous pulse generator,
said data processing means additionally time-sharing said digitally encoded time-shared signal with said video output signal, wherein the digital information occurs during the period between the pre-trigger output pulse and the synchronous output pulse and the video information occurs during the period between the synchronous pulse and the pre-trigger pulse, and
recording means coupled to said pre-trigger generator and receiving said combined time-shared signal for a line scan film recording whereby a recording is obtained for use in selecting the optimum mode radar transmission for detecting a particular target under particular environmental conditions.

6. The encoding and recording system of claim 5 wherein said recording means includes
a cathode ray tube receiving said combined time-shared signal, a sweep generator and drive mechanism for displaying a sweep on said cathode ray tube, film means exposed to said display on said cathode ray tube, and drive means for transporting said film means.

References Cited by the Examiner

UNITED STATES PATENTS

| | | | |
|---|---|---|---|
| 2,928,084 | 3/1960 | Ashby et al. | 343—5 |
| 3,063,036 | 11/1962 | Reach et al. | 340—172.5 |
| 3,153,232 | 10/1964 | Fletcher et al. | 343—6.5 X |
| 3,154,780 | 10/1964 | Burbeck et al. | 343—6.5 X |
| 3,161,872 | 12/1964 | McClure | 343—6.5 |
| 3,181,121 | 4/1965 | Losch et al. | 340—147 |
| 3,196,401 | 7/1965 | Lamneck | 340—172.5 |

CHESTER L. JUSTUS, *Primary Examiner.*

MAYNARD R. WILBUR, *Examiner.*

E. T. CHUNG, P. HINDERSTEIN, *Assistant Examiners.*